US011561899B2

(12) United States Patent
Accapadi et al.

(10) Patent No.: US 11,561,899 B2
(45) Date of Patent: Jan. 24, 2023

(54) METHOD AND SYSTEM OF MANAGING A FILE CACHE BY SELECTIVE DELETE-ON-READ OPERATIONS

(71) Applicant: International Business Machines Corporation, Armonk, NY (US)

(72) Inventors: Mathew Accapadi, Cedar Park, TX (US); Bret R. Olszewski, Austin, TX (US); Grover Cleveland Davidson, II, Leander, TX (US); Chad Collie, Springdale, AR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/424,658

(22) Filed: May 29, 2019

(65) Prior Publication Data

US 2020/0379906 A1 Dec. 3, 2020

(51) Int. Cl.
*G06F 12/00* (2006.01)
*G06F 12/0804* (2016.01)
*G06F 16/172* (2019.01)

(52) U.S. Cl.
CPC ........ *G06F 12/0804* (2013.01); *G06F 16/172* (2019.01); *G06F 2212/1044* (2013.01)

(58) Field of Classification Search
CPC ............... G06F 12/0804; G06F 16/172; G06F 2212/104
See application file for complete search history.

(56) References Cited

U.S. PATENT DOCUMENTS

| 5,261,051 A | * | 11/1993 | Masden | G06F 9/52 711/152 |
| 5,682,514 A | * | 10/1997 | Yohe | G06T 9/00 711/118 |
| 5,845,280 A | * | 12/1998 | Treadwell, III | H04L 29/06 |
| 6,023,744 A | * | 2/2000 | Shoroff | G06F 3/0608 707/999.202 |

(Continued)

OTHER PUBLICATIONS

Jew, E., "Part II: Updated Real-world Case Histories—How to Monitor and Analyze the VMM and Storage I/O Statistics of a Power/AIX LPAR", IBM Power Systems Technical University featuring IBM PureSystems, 2012, Extended Apr. 4, 2013, 39 pages.

(Continued)

*Primary Examiner* — Arvind Talukdar
(74) *Attorney, Agent, or Firm* — Daniel M. Yeates (57) ABSTRACT

Disclosed is a computer implemented method to manage a cache, the method comprising, determining that a primary application opens a first file, wherein opening the first file includes reading the first file into a file cache from a storage. The method also includes, setting a first monitoring variable in the primary application process proc structure, wherein the first monitoring variable is set in response to the primary application opening the first file, and the first monitoring variable records a set of operations completed on the first file by the primary application. The method comprises a first read of the first file being at a beginning of the first file. The method includes identifying that the first file is read according to a pattern that includes reading the first file sequentially and reading the first file entirely and removing the first file from the file cache.

17 Claims, 4 Drawing Sheets

(56) References Cited

U.S. PATENT DOCUMENTS

| | | | | |
|---|---|---|---|---|
| 6,480,834 | B1* | 11/2002 | Engle | G06F 3/0605 |
| 8,402,228 | B2 | 3/2013 | Anand et al. | |
| 8,510,510 | B1* | 8/2013 | Patil | G06F 16/14 |
| | | | | 711/136 |
| 9,195,601 | B2 | 11/2015 | Accapadi et al. | |
| 9,208,089 | B2 | 12/2015 | Accapadi et al. | |
| 2004/0064819 | A1* | 4/2004 | LaVoie | G06F 12/0875 |
| | | | | 719/310 |
| 2004/0236777 | A1* | 11/2004 | Pardikar | G06F 16/9574 |
| 2005/0138195 | A1* | 6/2005 | Bono | G06F 16/10 |
| | | | | 709/231 |
| 2006/0248124 | A1* | 11/2006 | Petev | G06F 12/0842 |
| | | | | 711/E12.039 |
| 2011/0145363 | A1* | 6/2011 | Ananthanarayanan | |
| | | | | G06F 16/172 |
| | | | | 709/218 |
| 2012/0102004 | A1* | 4/2012 | Johnson | G11B 27/034 |
| | | | | 707/692 |
| 2013/0198522 | A1* | 8/2013 | Kohno | G06F 21/62 |
| | | | | 713/182 |
| 2014/0149675 | A1* | 5/2014 | Accapadi | G06F 16/122 |
| | | | | 711/133 |
| 2016/0306643 | A1* | 10/2016 | Klee | G06F 3/0689 |

OTHER PUBLICATIONS

Barnett et al., "Optimizing SAP Sybase Adaptive Server Enterprise (ASE) for IBM AIX", An IBM and SAP Sybase white paper on optimizing SAP Sybase ASE 15 for IBM AIX 5L, AIX 6.1, and AIX 7.1 on IBM POWER5, POWER6 and POWER7 processor-based servers, Aug. 2013, 79 pages.

Anonymous, "A method to selectively refresh file pages in an NFS client", An IP.com Prior Art Database Technical Disclosure, IP.com No. IPCOM000237211D, IP.com Electronic Publication Date: Jun. 9, 2014, 4 pages.

IBM, "Method of fast file page replacement for sequential and synchronous file I/O", An IP.com Prior Art Database Technical Disclosure, IP.com No. IPCOM000099087D, IP.com Electronic Publication Date: Mar. 11, 2005, 2 pages.

Anonymous, "Providing Security to paged out pages to Virtual IO Server paging space partition in Active Memory Sharing environment", An IP.com Prior Art Database Technical Disclosure, IP.com No. IPCOM000236398D, IP.com Electronic Publication Date: Apr. 24, 2014, 9 pages.

* cited by examiner

METHOD AND SYSTEM OF MANAGING A FILE CACHE BY SELECTIVE DELETE-ON-READ OPERATIONS

BACKGROUND

The present disclosure relates to computing systems, and, more specifically, to managing a file cache.

In many modern computing systems one or more processors working together can run multiple applications (e.g. programs) simultaneously. To execute a program, the operating system, in simple terms, receives system calls from an application, then directs the processor to fetch the data to be processed, processes the data per the instructions (e.g. code), then writes the processed data to a storage location. Many versions of modern architecture use levels of memory to increase the efficiency of the overall system. There is a long-term storage, usually larger capacity but relatively slow, and short-term storage (e.g., random access memory RAM, cache, etc.) that are much faster but can have a relatively small capacity.

SUMMARY

Disclosed is a computer implemented method to remove unneeded data from a cache, the method comprising, determining that a primary application opens a first file, wherein opening the first file includes reading the first file into a file cache from a storage. The method also includes, setting a first monitoring variable in the primary application process proc structure, wherein the first monitoring variable is set in response to the primary application opening the first file, and wherein the first monitoring variable records a set of operation completed on the first file by the primary application. The method further comprises a first read of the first file being at a beginning of the first file. The method also includes identifying that the first file is read according to a pattern that includes reading the first file sequentially and reading the first file entirely, and removing, in response to the first file being read according to the pattern, the first file from the file cache.

Also disclosed is a computer implemented method to use flags to manage a cache, the method comprising determining that a primary application opens a first file, wherein the primary application is configured to set a plurality of flags when it opens a file. The method also discloses, setting a first flag with the first file, wherein the first flag includes a set of conditions. The method further comprises, determining that the set of conditions of the first flag are satisfied, and initiating, in response to determining the set of conditions of the first flag are satisfied, a release-behind algorithm for the first file.

Further aspects of the present disclosure are directed to systems and computer program products containing functionality consistent with the method described above.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to computing systems, and, more specifically, to managing a file cache. Aspects of the present disclosure may be better appreciated in light of the aforementioned applications.

In many modern computing systems one or more processors working together can run multiple applications (e.g. programs) simultaneously. To execute a program, the operating system, in simple terms, receives system calls from an application, directs the processor to fetch the data to be processed, processes the data per the instructions (e.g., code), then writes the processed data to a storage location.

Many versions of modern architecture use levels of memory to increase the efficiency of the overall system. For example, one level can include long-term storage that can have relatively larger storage capacity but relatively slower processing speed. Another level can include short-term storage (e.g., random access memory RAM, cache, etc.) that can have relatively faster processing speed but relatively smaller storage capacity. In response to a system call, the operating system or a kernel directs data to be read from the long-term storage and written into a cache. For purposes of this disclosure, the short-term, fast memory will be referred to as the cache. Then the processor can access the cached data and process it as directed.

Embodiments of the present disclosure recognize that when a kernel is operating multiple applications, the relatively small cache can fill up. When that happens, the kernel must selectively flush and replace previously used data for pending processes. When files being used by one or more applications are flushed from the cache, additional computing resources are used to bring the data back into the cache.

Embodiments of the present disclosure can identify and selectively flush data from the system cache that is unlikely to be needed in the near future by any running application. This may increase the overall efficiency of the system by reducing the amount of data that is read into the cache multiple times.

In some embodiments, a release-behind algorithm is initiated when the system determines a certain file will not be read again by the application that opened it. The release-behind algorithm is a process that may alter the normal data flow into and out of a cache by releasing certain data promptly after it is read into the cache. For purposes of this disclosure, a file is a section of data stored in a computing system. A file may be divided into clusters, and a cluster may be made up of pages. Generally, each cluster is uniform in size (e.g., 32 pages, 128 KB of data, etc.)

Embodiments of the present disclosure are particularly beneficial when an application reads the data in a file only once. For example, the application opens a file, reads the data in the file one time from beginning to end, closes the file, and will not re-read any data from the file. In various embodiments, this general process is used by backup software, or when searching for a string in a file directory (e.g., a global regular expression print "GREP" command).

Embodiments of the present disclosure use a file release manager to monitor the cache and selectively initiate a release-behind algorithm. In some embodiments, the file release manager initiates the release-behind algorithm after detecting a pattern used by the application. In some embodiments, the file release manager monitors one or more applications for a pattern. The pattern can be any pattern that indicates each file opened by the application will only be read once. In some embodiments, the release-behind algorithm is initiated after two or more consecutive documents are determined to be following a pattern. In some embodiments, the pattern is as follows: (1) the file is opened, (2) the file is read from beginning to end, and (3) the file is then closed. In these embodiments, the files that have been read according to the pattern can then be immediately released from the cache. This will allow files that will be read multiple times by one or more applications to remain in the cache and thereby increase the overall efficiency of the system.

In some embodiments, the file release manager initiates the release-behind algorithm based on flags set by the application. In some embodiments, the system call by the application includes one or more flags. The flags can indicate the release-behind algorithm can be used on the associated files if one or more conditions are met after the reading is complete. In some embodiments, the file release manager checks for the flag conditions once reading is complete. In these embodiments, the file can be released from the cache when the conditions are met. In various embodiments, the conditions are based on completing reading the file and whether one or more additional applications are using the same file. This prevents files and/or clusters that are being utilized by two or more application from being flushed from the cache when the release-behind algorithm would have otherwise been initiated. Thus, overall efficiency of the computing system may be increased.

The aforementioned advantages are example advantages, and embodiments exist that can contain all, some, or none of the aforementioned advantages while remaining within the spirit and scope of the present disclosure.

Figure 1:
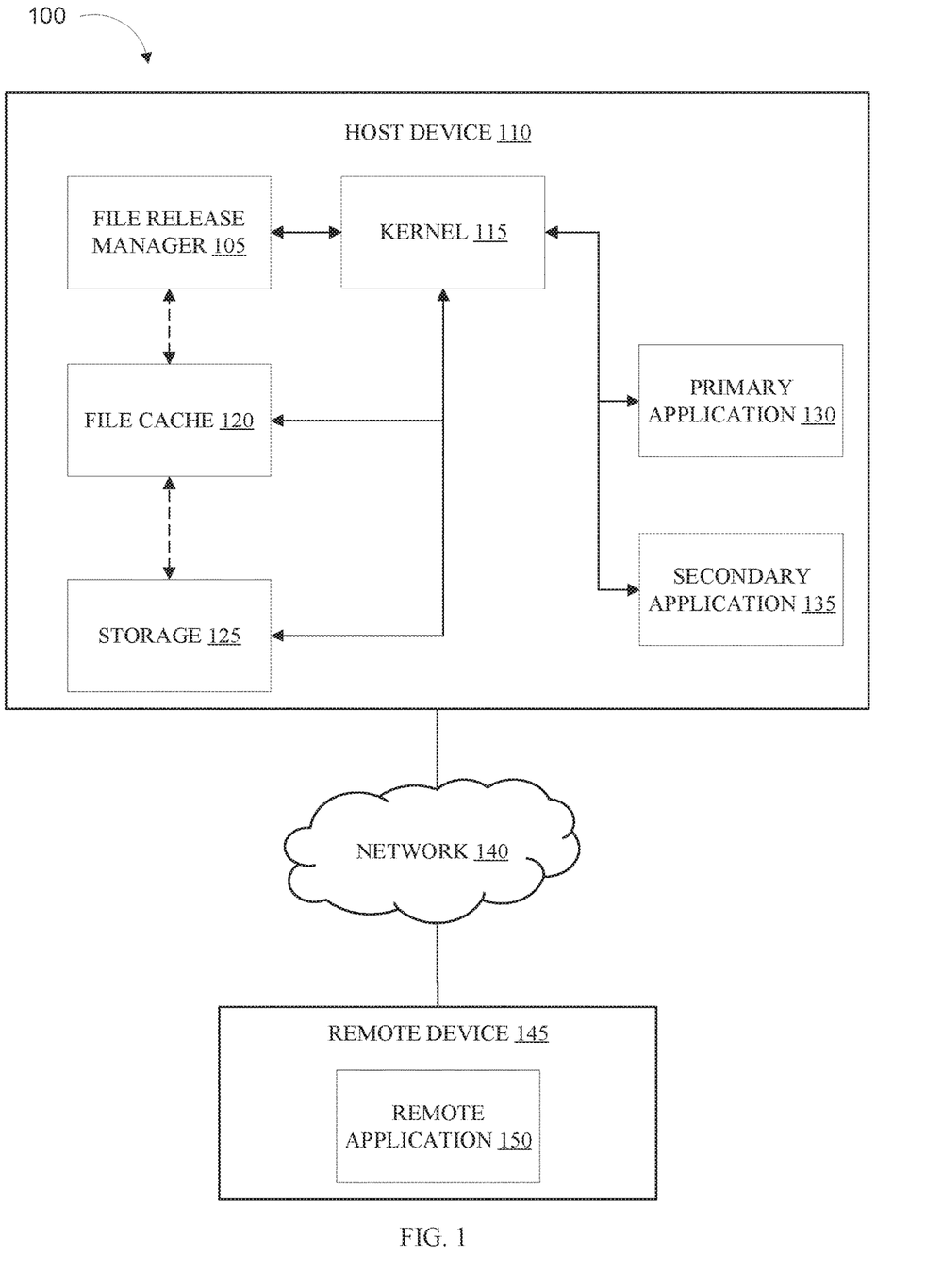
FIG. 1 illustrates a functional diagram of a computing environment suitable for operation of a file release manager, in accordance with embodiments of the present disclosure.

Referring now to various embodiments of the disclosure in more detail, FIG. 1 is a representation of one embodiment of a computing environment, labeled 100, configured to run a file release manager 105. FIG. 1 provides illustrations of one potential implementation and does not imply any limitation with regard to the environments in which different embodiments may be implemented. Many modifications of the depicted environment may be made by those skilled in the art without departing from the spirit and scope of the present disclosure. Computing environment 100 includes host device 110, network 140, and remote device 145.

Host device 110 can be, for example, a standalone computing device, a management server, a web server, a mobile computing device, or any other electronic device or computing system capable of receiving, sending, and processing data. In some embodiments, host device 110 can be one of many processors, or a portion of the computing device. In other embodiments, host device 110 can represent a server computing system utilizing multiple computers, such as in a cloud computing environment. In some embodiments, host device 110 represents a computing system utilizing clustered computers and components (e.g., database server computers, application server computers, etc.) that act as a single pool of seamless resources when accessed within computing environment 100. Host device 110 may include internal and external hardware components, as depicted and described in further detail with respect to FIG. 4. In some embodiments, host device 110 includes file release manager 105, kernel 115, file cache 120, storage 125, primary application 130, and secondary application 135.

Kernel 115 can be any combination of hardware and software capable of managing the workload of host device 110. In some embodiments, kernel 115 receives system calls from one or more applications (e.g., primary application 130, secondary application 135, etc.) requesting resources of host device 110. In these embodiments, kernel 115 prioritizes and executes the system calls based on algorithm. In some embodiments, kernel 115 is part of the operating system of host device 110.

In some embodiments, kernel 115 manages the reading of data into file cache 120, and the removal of data from file cache 120. In some embodiments, kernel 115 can include file release manager 105. In some embodiments, kernel 115 monitors the data in file cache 120.

In some embodiments, kernel 115 can use flags to track data in file cache 120 and initiate the release-behind algorithm. In some embodiments, kernel 115 monitors applications for patterns relating to file cache 120 (e.g. reading multiple files sequentially and only one time).

File cache 120 can be any combination of hardware and/or software that stores data to be processed. Generally, a cache is a fast but relatively small memory bank used to store frequently used data to decrease fetch and read times. In some embodiments, file cache 120 is smaller (e.g. stores less data) and faster than other storage (e.g., storage 125) in host device 110. In some embodiments, file cache 120 includes two or more separate cache systems that work in unison under the direction of kernel 115. In some embodiments, file cache 120 can wholly or partially include random access memory (RAM) of host device 110. In some embodiments, file cache 120 may be comprised of a read cache and a write cache.

In various embodiments, data is kept in file cache 120 according to one or more algorithms. For example, one algorithm can be least recently used (LRU). In an LRU cache, the data that has not been used for the longest period of time is flushed from the cache when new data needs to be written to the cache. In some embodiments, the algorithms that can manage a cache include, but are not limited to, pseudo least recently used (PLRU), first in first out (FIFO), last in first out (LIFO), etc.

In some embodiments, the algorithm that manages the file caches can be altered. In some embodiments, the algorithm is altered by initiating a release-behind algorithm for one or more files.

Storage 125 can be any combination of hardware and/or software configured to store data. In some embodiments, storage 125 stores the programs and instructions to operate and manage file release manager 105, host device 110, kernel 115, primary application 130, secondary application 135, and/or any other programs or modules configured to operate in host device 110.

In various embodiments, storage 125 includes one or more of cloud storage (public or private), tape drives, HDD, SAS drives, SSD, and any other storage medium known in the art. In some embodiments, storage 125 has a larger capacity than file cache 120. In some embodiments, data from storage 125 is transferred to file cache 120 by kernel 115 (e.g., data is read from storage 125 and written into the file cache 120). In these embodiments, the transfer occurs at the request of a program or application (e.g., kernel 115, primary application 130, etc.).

Primary application 130 can be any combination of hardware and/or software configured to carry out a function on a computing device (e.g., host device 110). In some embodiments, primary application 130 is a software program (e.g., accounting software, system backup software, word processor, etc.). In some embodiments, primary application 130 is a web application. In some embodiments, primary application 130 is a set of instructions configured to perform one or more tasks.

In some embodiments, primary application 130 makes calls to kernel 115. In response to the calls, data is read from storage 125 or another data storage system and read into file cache 120 to be processed.

In some embodiments, primary application 130 uses flags. In some embodiments, the flags indicate additional data related to the system call. In some embodiments, the flag indicates how the application is processing the data (e.g., reading sequentially, reading multiple times, etc.).

Secondary application 135 can be any combination of hardware and/or software configured to carry out a function on a computing device (e.g., host device 110). In some embodiments, secondary application 135 is a software program. For example, secondary application 135 may be a web application. Secondary application 135 may include a set of instructions configured to perform one or more tasks.

In some embodiments, secondary application 135 makes calls to kernel 115. In response to the calls, data is read from storage 125 or another data storage system and read into file cache 120 to be processed.

In some embodiments, primary application 130, secondary application 135 and/or other applications (not shown) can simultaneously makes calls to kernel 115.

In some embodiments, secondary application 135 uses flags. In some embodiments, the flags indicate additional data related to the system call. In some embodiments, the flag indicates how the application is processing the data (e.g., reading sequentially, reading multiple times, etc.).

Network 140 can be, for example, a telecommunications network, a local area network (LAN), a wide area network (WAN), such as the Internet, or a combination of the three, and can include wired, wireless, or fiber optic connections. Network 140 may include one or more wired and/or wireless networks that are capable of receiving and transmitting data, voice, and/or video signals, including multimedia signals that include voice, data, and video information. In general, network 140 may be any combination of connections and protocols that will support communications between host device 110, remote device 145, and other computing devices (not shown) within computing environment 100.

Remote device 145 can be, for example, a standalone computing device, a management server, a web server, a mobile computing device, or any other electronic device or computing system capable of receiving, sending, and/or processing data. In some embodiments, remote device 145 can be one of many processors of a computing device, and/or a portion of the computing device. In other embodiments, remote device 145 can represent a server computing system utilizing multiple computers, such as in a cloud computing environment. In some embodiments, remote device 145 represents a computing system utilizing clustered computers and components (e.g., database server computers, application server computers, etc.) that act as a single pool of seamless resources when accessed within computing environment 100. Remote device 145 may include internal and external hardware components (not shown), consistent with those of host device 110. In some embodiments, remote device 145 includes remote application 150.

Remote application 150 can be any combination of hardware and/or software configured to carry out a function on a computing device (e.g., host device 110). In some embodiments, remote application 150 is a software program (e.g., accounting software, system backup software, word processor, etc.). In some embodiments, remote application 150 is a web application. In some embodiments, remote application 150 is a set of instructions configured to perform one or more tasks.

In some embodiments, remote application 150 makes calls to kernel 115, via network 140. In response to the calls, data is read from storage 125 or another data storage system and read into file cache 120 to be processed.

In some embodiments, remote application 150 uses flags. In some embodiments, the flags indicate additional data related to the system call. In some embodiments, the flag indicates how the application is processing the data (e.g., reading sequentially, reading multiple times, etc.).

Figure 2:
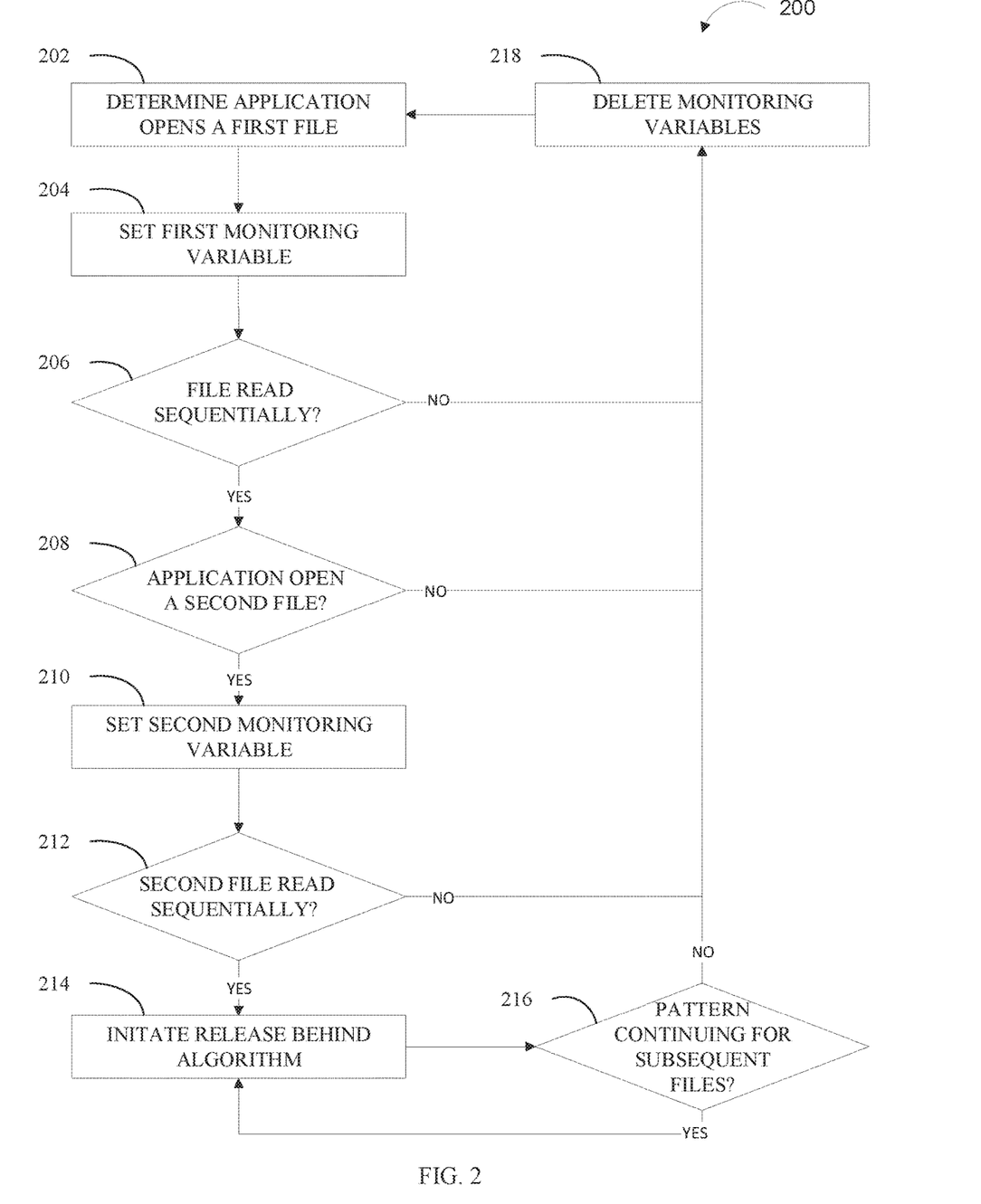
FIG. 2 illustrates a flowchart of an example method of release-behind of files based on a pattern of use, in accordance with embodiments of the present disclosure.

FIG. 2 depicts a flowchart of an example method, method 200, that can monitor for patterns of use to remove unneeded data from a cache. One or more of the advantages and improvements described above for initiating the release-behind algorithm can be realized by the method 200, consistent with various embodiments of the present disclosure.

Method 200 can include more or fewer operations than those depicted. Method 200 can include operations in different orders than the order depicted. Likewise, the method 200 can include operations that occur simultaneously rather than sequentially. Many modifications to the depicted method may be made by those skilled in the art without departing from the spirit and scope of the present disclosure. Method 200 can be implemented by one or more processors, a file release manager (e.g., file release manager 105), a computing device (e.g., host device 110), and/or a different combination of hardware and/or software. In various embodiments, the operations of method 200 are performed by one or more of file release manager 105, kernel 115, host device 110, primary application 130, secondary application 135, remote device 145, remote application 150 and/or other computing devices (not shown) within computing environment 100.

At operation 202, file release manager 105 determines that primary application 130 opens a first file. In some embodiments, the application that opens the file can be secondary application 135, and/or remote application 150, however, primary application 130 will be used, as an example, to describe the remainder method 200.

In some embodiments, kernel 115 determines that an application opens the file. In some embodiments, opening the file includes sending a request to kernel 115 to write a file into file cache 120. In some embodiments, the determination is made when the first file is written into file cache 120.

In some embodiments, the determination is made by monitoring requests received by kernel 115. In some embodiments, the determination is made by executing a system call by primary application 130 to open the first file.

In some embodiments, the determination is made by kernel 115 completing a system call to open the first file submitted by primary application 130.

At operation 204, file release manager 105 sets a first monitoring variable. A monitoring variable can be data that indicates and/or records how a file is being utilized by file release manager 105, kernel 115, file cache 120, host device 110, and/or any or components or computing devices. Each time a file is opened and/or written into file cache 120, a monitoring variable can be set for that file. The monitoring variable data can be sent to and/or used by file release manager 105 to monitor for one or more patterns that an application (e.g., primary application 130) is using. In some embodiments, the monitoring variables (e.g., first monitoring variable) record a set of operations performed on the related file. The operation can be the operations performed by the program that opened the file. The operations that can be recorded include, but are not limited to, calls, hits, reads, writes, order of reading, etc.

In some embodiments, the first monitoring variable is set in the application's proc filesystem (procfs). Procfs is an in-memory file-system structure that has process characteristics that are readable by the kernel. In some embodiments, the first monitoring variable can determine if a file is read from beginning to end. In some embodiments, the first monitoring variable determines if the document is read in its entirety.

In some embodiments, the first monitoring variable is set based on the system call received from the application. For example, the system call can be primary application 130 requesting that the file be read sequentially. In some embodiments, the first monitoring variable is updated based on subsequent system calls. For example, in a first system call, primary application 130 can request a file be written into file cache 120. Once that first system call is complete, a second system call can request to read the file sequentially. Then kernel 115 can update the first monitoring variable. In some embodiments, the first monitoring variable is set when file release manager 105 determines that the first read was at the beginning of the file.

At operation 206, file release manager 105 determines if the file was read sequentially. If the file was read sequentially (decision tree "YES" branch), then file release manager 105 proceeds to operation 208. If the file was not read sequentially (decision tree "NO" branch), then file release manager 105 proceeds to operation 218 (described in further detail below).

In some embodiments, file release manager 105 determines that the file is read sequentially based on the first monitoring variable. In some embodiments, file release manager 105 determines that the file is read sequentially by logging all actions that occur to the file while in file cache 120. In these embodiments, the logging is done by kernel 115 and/or other components in computing environment 100. In some embodiments, file release manager 105 determines that the file is read sequentially by checking the logged actions to see if the file was read sequentially.

In some embodiments, kernel 115 determines if the first file was read sequentially. In some embodiments, the determination is made using a readahead algorithm. A readahead algorithm is a process by which data that is likely to be written into a cache (e.g., file cache 120) is preemptively fetched and written into the cache. In some embodiments, the readahead algorithm is invoked as part of the system call from primary application 130.

At operation 208, file release manager 105 determines if the application opens a second file. If the application did open a second file (decision tree "YES" branch), then file release manager 105 proceeds to operation 210. If the application did not open a second file (decision tree "NO" branch), then file release manager 105 proceeds to operation 218 (described in further detail below). In some embodiments, determining primary application 130 opens a second file can be consistent with operation 202.

In some embodiments, file release manager 105 determines primary application 130 opens a second file by monitoring system calls made by primary application 130. In some embodiments, opening the file includes reading the file data in storage 125 and reading the data into file cache 120. In some embodiments, it is determined the second file has been opened when the second file is written into file cache 120.

In some embodiments, kernel 115 determines primary application 130 opens the second file. In some embodiments, the determination is made by monitoring requests received by kernel 115. In some embodiments, the determination is made by executing a system call by primary application 130 to open the second file. In some embodiments, the determination is made by kernel 115 completing a system call to open the second file submitted by primary application 130.

In some embodiments, if primary application 130 does not open the second file before a trigger, then it is determined no second file was opened. In some embodiments, the trigger can be a period of time (e.g., 3 seconds), a number of processing cycles, a number of calls received from primary application 130, a number of calls received by kernel 115, other similar parameters, and/or any combination of the foregoing.

At operation 210, file release manager 105 sets a second monitoring variable. In some embodiments, the second monitoring variable is set on the second file opened by the application. In some embodiments, operation 210 can be consistent with operation 204.

In some embodiments, the second monitoring variable is set in the application process's proc structure. In some embodiments, the second monitoring variable can determine if a file is read from beginning to end. In some embodiments, the first monitoring variable determines if the document is read in its entirety. In some embodiments, the beginning of a file refers to the first instance of data relating to the file being stored in a storage system (e.g., storage 125). For example, if the file is a textual document, the beginning of the file is not necessarily where the text of the file starts, rather it is the first cluster of data that may define the document type, the document margins, the document headings, and/or other data that makes up a word document. Similarly, the end of a file is the last piece of data that is stored in a storage system (e.g., storage 125) related to the file. As discussed above, the end of the file may not necessarily be the last data that represents text in the document.

In some embodiments, the second monitoring variable is set based on the system call received from primary application 130. For example, the system call can be primary application 130 requesting the second file be read sequentially. In some embodiments, the second monitoring variable is updated based on subsequent system calls. For example, in a third system call, primary application 130 can request the second file be read into file cache 120. Once that third system call is complete, a fourth system call can request to read the second file sequentially. Then kernel 115 can update the second monitoring variable. In some embodiments, the second monitoring variable is set when file release manager 105 determines that the first read of the second file was at the beginning of the file.

At operation 212, file release manager 105 determines if the second file is being read sequentially. If the second file is being read sequentially (decision tree "YES" branch), then file release manager 105 proceeds to operation 214. If the file is not being read sequentially (decision tree "NO" branch), then file release manager 105 proceeds to operation 218 (described in further detail below). In some embodiments, operation 212 can be consistent with operation 206.

In some embodiments, file release manager 105 determines that the second file is being read sequentially based on the first monitoring variable. In some embodiments, by logging all actions that occur to the file while in file cache 120. In these embodiments, the logging is done by kernel 115 and/or other components in computing environment 100. In some embodiments, file release manager 105 determines that the second file is read sequentially by checking the logged actions to see if the second file was read sequentially.

In some embodiments, kernel 115 determines if the second file was read sequentially. In some embodiments, the determination is made using a readahead algorithm. A readahead algorithm is a process by which data that is likely to be written into a cache (e.g., file cache 120) is preemptively fetched and written into the cache. In some embodiments, the readahead algorithm is invoked as part of the system call from primary application 130.

At operation 214, file release manager 105 initiates a release-behind algorithm. In some embodiments, the release-behind algorithm removes files from a cache (e.g., file cache 120) that are not likely to be read again.

In some embodiments, the release-behind algorithm is initiated in response to file release manager 105 detecting a pattern. In some embodiments, operations 202 to 212 can determine primary application 130 is reading files according a pattern. In some embodiments, the release-behind algorithm is initiated in response to the second monitoring variable matching the first monitoring variable (e.g., two or more consecutive documents that were opened, read from beginning to end, then closed).

In some embodiments, the release-behind algorithm selectively removes data from file cache 120. In some embodiments, the data is removed in response to kernel 115 receiving a system call from secondary application 135 to write more data into file cache 120. In some embodiments, the data removed is data that is not needed by any running application or process. This prevents data that is needed by a secondary application 135 (and/or remote application 150) from being flushed from file cache 120. This increases the efficiency of the system by using computing resources to re-write the data for secondary application 135 back into file cache 120.

In some embodiments, the release-behind algorithm releases the first file data from file cache 120. In these embodiments, primary application 130 has already completed all actions related to the first file. In some embodiments, the release-behind algorithm releases data from the second file from file cache 120. In some embodiments, the data for the second file is released cluster by cluster, immediately after each cluster has been read, thereby freeing the space for additional files for primary application 130 or for files from secondary application 135.

In some embodiments, the release-behind algorithm includes deleting the first monitoring variable and changing the second monitoring variable to the first monitoring variable.

At operation, 216 file release manager 105 determines if primary application 130 continues the same pattern followed with the first file and the second file on subsequent files. If the pattern on subsequent files is continuing (decision tree "YES" branch), then file release manager 105 returns to operation 214. If the pattern on subsequent files is not continuing (decision tree "NO" branch), then file release manager 105 proceeds to operation 218 (described in further detail below).

In some embodiments, file release manager 105 determines that the pattern is being continued by repeating the steps in operations 208 through 212, except file release manager 105 would monitor for a third file and set a third monitoring variable (or any subsequent number).

In some embodiments, in response to identifying that the subsequent file is not read according to the pattern, file release manager 105 stops the release-behind algorithm.

At operation 218, file release manager 105 deletes the monitoring variables. In some embodiments, kernel 115 deletes the monitoring variables. In some embodiments, the first monitoring variable, the second monitoring variable, and any subsequent monitoring variables are deleted. At the completion of operation 218, file release manager 105 returns to operation 202 to determine when an application opens another file.

Figure 3:
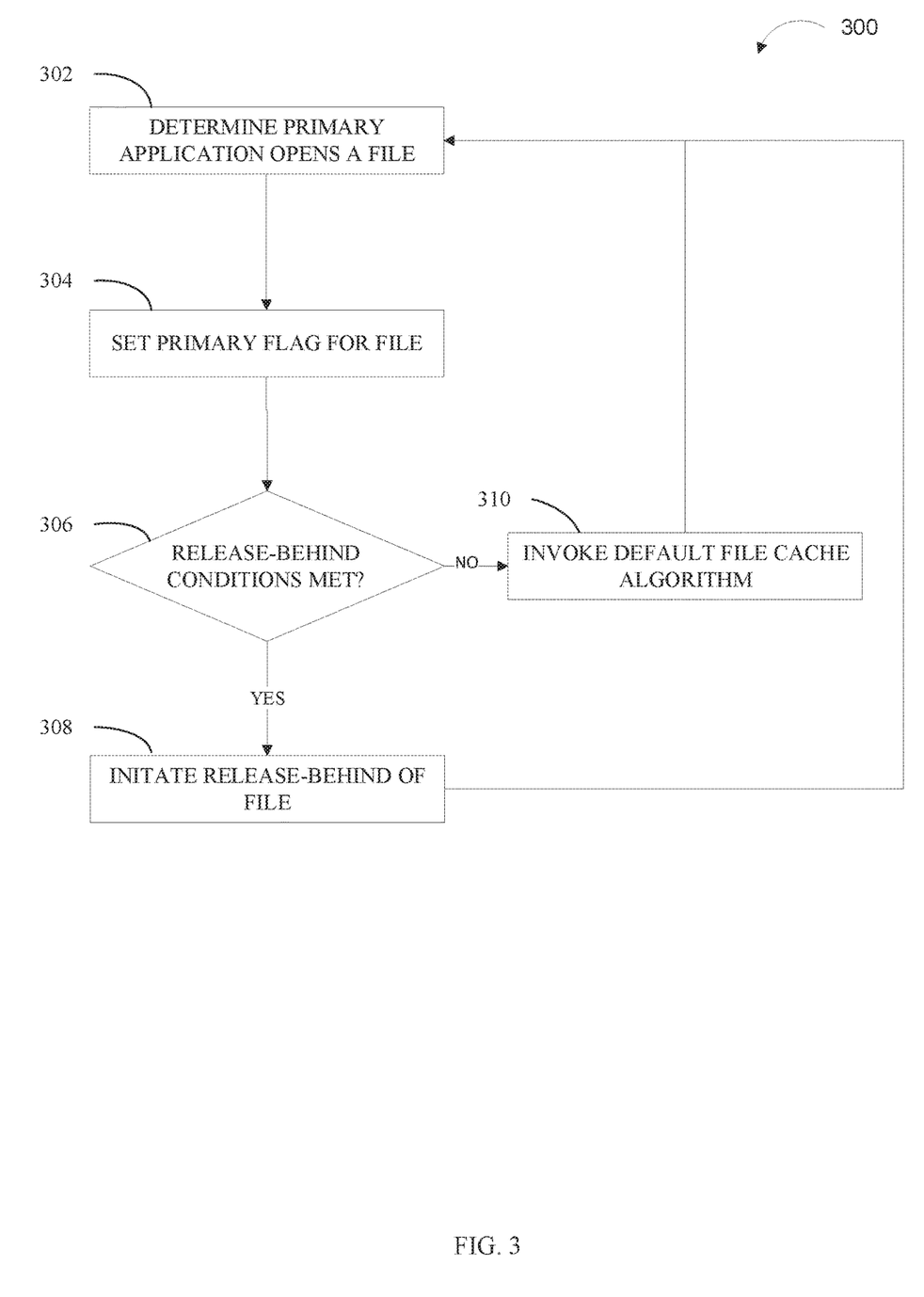
FIG. 3 illustrates a flowchart of an example method of release-behind of files based on flags, in accordance with embodiments of the present disclosure.

FIG. 3 depicts a flowchart of an example method, method 300, that can remove unneeded data from a cache with the use of flags. One or more of the advantages and improvements described above for initiating the release-behind algorithm can be realized by the method 300, consistent with various embodiments of the present disclosure.

Method 300 can include more or fewer operations than those depicted. Method 300 can include operations in different orders than the order depicted. Likewise, the method 300 can include operations that occur simultaneously rather than sequentially. Many modifications to the depicted method may be made by those skilled in the art without departing from the spirit and scope of the present disclosure. Method 300 can be implemented by one or more processors, a file release manager (e.g., file release manager 105), a computing device (e.g., host device 110), and/or a different combination of hardware and/or software. In various embodiments, the operations of method 300 are performed by one or more of file release manager 105, kernel 115, host device 110, primary application 130, secondary application 135, remote device 145, remote application 150 and/or other computing devices (not shown) within computing environment 100.

At operation 302, file release manager 105 determines that primary application 130 opens a file. In some embodiments, operation 302 is consistent with operation 202 and operation 208 of FIG. 2. In some embodiments, the application that opens the file can be the primary application 130, the secondary application 135, and/or the remote application 150. However, for ease of discussion, primary application 130 will be used, as an example, to describe the remainder of the method 300.

In some embodiments, kernel 115 determines that primary application 130 opens the file. In some embodiments, opening the file includes sending a request to kernel 115 to write a file into file cache 120. In some embodiments, the determination is made when the file is written into file cache 120.

In some embodiments, the determination is made by monitoring requests received by kernel 115. In some embodiments, the determination is made by executing a system call by primary application 130 to open the file. In some embodiments, the determination is made by kernel 115 completing a system call to open the file submitted by primary application 130.

At operation 304, file release manager 105 sets primary flags for the file. In some embodiments, a flag is a bit setting that reveals information related to how the file is going to be used. In some embodiments, file release manager 105 can set a plurality of flags for one file. In some embodiments, the flag is part of the system call to kernel 115. For example, the flag can indicate either that the data should be read into file cache 120, or that the data can bypass file cache 120 and be written directly to storage 125. In some embodiments, the flag can indicate the release-behind algorithm can be used on the file.

In some embodiments, the flag can indicate the release-behind algorithm should be initiated on the file after the read is complete. In some embodiments, the flag can indicate the release-behind algorithm should be initiated if the file is not currently in file cache 120. In these embodiments, if the file or portion of the file is in file cache 120 when the system call is made, then it is assumed another application (e.g., secondary application 135), is using that data and that as such the data should not be flushed as quickly. In some embodiments, secondary application 135 sets a secondary flag on the first file when it opens the first file.

In some embodiments, the flag can indicate the release-behind algorithm should be initiated if the file is not currently open by secondary application 135 (or remote application 150). In these embodiments, file release manager 105 assumes any data in the file cache 120 is being used by secondary application 135. In some embodiments, secondary application 135 removes the secondary flag when it closes the file (e.g., has no more need for that file). In these embodiments, file release manager 105 initiates the release-behind algorithm if no other application has a flag associated with the first file. At various times the data is called into file cache 120, and the operation on that portion of data is no longer needed. In some embodiments, the data can be flushed using the release-behind algorithm if secondary application 135 is no longer using the data.

In some embodiments, the flag can indicate the release-behind algorithm should be initiated on portions of the file that cause page faults by primary application 130. A page fault (or file fault) occurs when the data requested in a system call is not present in file cache 120. In various embodiments, an entire file or portions of the file can be read into file cache 120. In these embodiments, the release-behind algorithm would be initiated on portions of the file that are read into file cache 120 by primary application 130 and ignore those read into file cache 120 by secondary application 135. In some embodiments, the flag can indicate the release-behind algorithm should be initiated in response to a file fault. Each file fault is associated (linked, connected, etc.) to a file. In these embodiments, the file fault causes primary application 130 to write at least a portion of the file into file cache 120.

In some embodiments, primary application 130, secondary application 135, and/or remote application 150 are configured to set flags when they make a call to open a file.

At operation 306, file release manager 105 determines if the conditions of the release-behind flag are met. If the conditions of the release-behind flag are met (decision tree "YES" branch), then file release manager 105 proceeds to operation 308. If the conditions of the release-behind flag are not met (decision tree "NO" branch), then file release manager 105 proceeds to operation 310 (described in further detail below).

In some embodiments, file release manager 105 determines if the conditions of the release-behind flag are met by checking for flags set by secondary application 135. In some embodiments, the determination is made by obtaining the data from kernel 115. In some embodiments, the determination is made by analyzing the data stored in file cache 120.

At operation 308, in response to determining the release-behind conditions are met in operation 206, file release manager 105 initiates the release-behind algorithm for the file. In some embodiments, operation 308 is consistent with operation 214 of FIG. 2. In some embodiments, file release manager 105 returns to operation 302 at the completion of operation 308.

In some embodiments, the release-behind algorithm releases the file data from file cache 120. In these embodiments, the primary application 130 has already completed all actions related to the first file. In some embodiments, the data for the second file is released cluster by cluster, immediately after each cluster has been read, freeing the space for additional files for primary application 130, or for files from secondary application 135.

At operation 310, in response to determining the release-behind conditions are not met in operation 206, file release manager 105 invokes the default algorithm to manage file cache 120. In some embodiments, file release manager 105 returns to operation 302 at the completion of operation 310.

In various embodiments, the method 200 and method 300 can be used simultaneously. For example, assume secondary application 135 is configured to set release-behind flags, but primary application 130 is not. Method 200 can be used to monitor the pattern used by primary application 130, however, a flag placed by secondary application 135, indicating a file will be read several times, prevents file release manager 105 from initiating the release-behind algorithm for that file.

Figure 4:
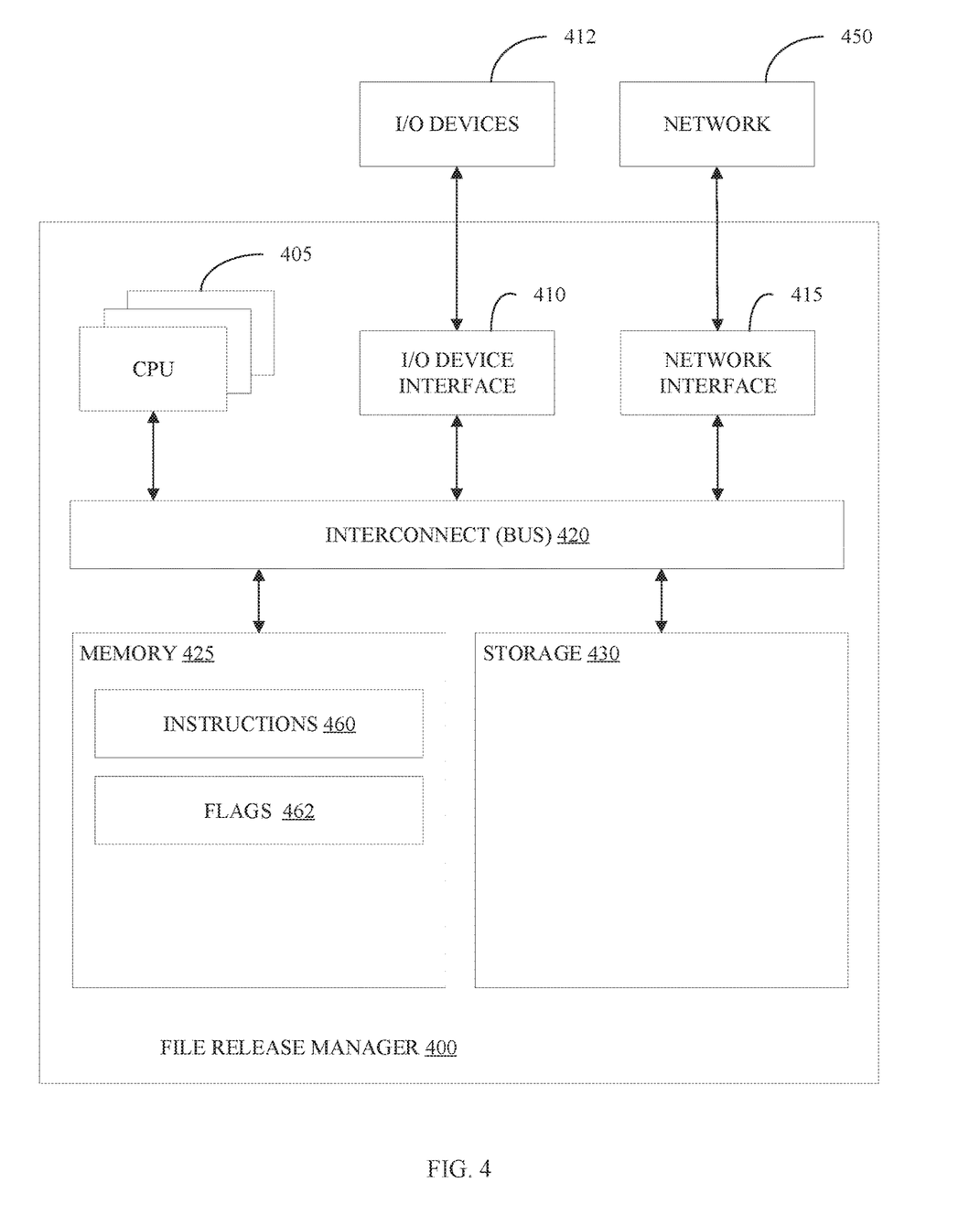
FIG. 4 illustrates a block diagram of an example file release manager, in accordance with embodiments of the present disclosure.

FIG. 4 illustrates a block diagram of an example file release manager 400 in accordance with some embodiments of the present disclosure. In some embodiments file release manager 400 can perform the methods 200 and 300 as described in FIGS. 2-3. In some embodiments, file release manager 400 provides instructions for any of the methods 200 and 300 of FIGS. 2-3 to a client machine such that the client machine executes the method, or a portion of the method, based on the instructions provided by the file release manager 400. In some embodiments, file release manager 400 is consistent with file release manager 105 of FIG. 1.

The file release manager 400 includes a memory 425, storage 430, an interconnect (e.g., BUS) 420, one or more CPUs 405 (also referred to as processors herein), an I/O device interface 410, I/O devices 412, and a network interface 415.

Each CPU 405 retrieves and executes programming instructions stored in the memory 425 or storage 430. The interconnect 420 is used to move data, such as programming instruction, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in some embodiments. In some embodiments, a CPU 405 can be a digital signal processor (DSP). In some embodiments, CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP CPU configurations). Memory 425 is generally included to be representative of a nonvolatile memory, such as a hard disk drive, solid state device (SSD), removable memory cards, optical storage, or flash memory devices. In an alternative embodiment, the storage 430 can be replaced by storage area-network (SAN) deices, the cloud, or other devices connected to the file release manager 400 via the I/O device interface 410 or a network 450 via the network interface 415.

In some embodiments, the memory 425 stores instructions 460 and flags 462. However, in some embodiments, the instructions 460 and flags 462 are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all of, any of the methods 200 and 300 of FIGS. 2-3.

Flags 462 is a collection of flags that have been set by one or more applications when opening a file. The flags 462 can indicate an intended/current use for the file and/or cluster.

In some embodiments, the I/O devices 412 include an interface capable of presenting information and receiving input. For example, I/O device 412 can present information to a user interacting with file release manager 400 and receive input from the user.

File release manager 400 is connected to the network 450 via the network interface 415. Network 450 can comprise a physical, wireless, cellular, or different network.

Embodiments of the present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instruction can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instruction can also be stored in a computer readable storage medium that can direct a computer, a programmable data processing apparatus, and/or other devices to function in a particular manner, such that the computer readable storage medium having instructions stored therein comprises an article of manufacture including instructions which implement aspect of the function/act specified in the flowchart and/or block diagram block or blocks.

The computer readable program instruction can also be loaded onto a computer, other programmable data processing apparatus, or other device to cause a series of operations steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present disclosure. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any subset of the methods described with respect to FIGS. 2-3) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present disclosure can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

What is claimed is:

1. A computer-implemented method, the method comprising:
    determining, by a kernel, that a primary application opens a first file, wherein opening the first file includes writing the first file into a file cache from a storage, the file cache is configured to receive data based on a call from a second application, and a cache management algorithm manages data flow into and out of the file cache;
    setting, by the kernel, a first monitoring variable for the first file in the primary application process proc structure, wherein the first monitoring variable is set in response to the primary application opening the first file and writing the first file into the file cache, and wherein the first monitoring variable records a set of all operations completed on the first file by the first application and a second application, and wherein a first read of the first file is at a beginning of the first file;
    identifying, by the kernel and based on the set of all operations completed on the first file included in the first monitoring variable, that the first file is read according to a pattern by the primary application, wherein the pattern includes reading a file sequentially, reading the file entirely, and closing the file;
    determining, by the kernel, that the primary application opens a second file;
    setting, by the kernel, a second monitoring variable for the second file, wherein the second monitoring variable is set in response to the primary application opening the second file, and wherein the second monitoring variable records a second set of operations performed on the second file by the first application;
    identifying, by the kernel, that the second file is read according to the pattern by the first application; and
    initiating, in response to the first file and the second file being read according to the pattern, a release-behind algorithm, wherein the release-behind algorithm alters the cache management algorithm by promptly flushing the first file and the second file from the file cache.

2. The computer-implemented method of claim 1, wherein the second file is divided into a plurality of clusters including a first cluster and a second cluster, and wherein the flushing further comprises:
    determining that the first cluster of the second file has been read entirely;
    initiating reading the second cluster of the second file;
    removing, in response to initiating reading the second cluster of the second file, the first cluster of the second file from the file cache;
    determining that the second cluster of the second file has been read entirely; and
    removing, in response to determining the second cluster of the second file has been read entirely, the second cluster of the second file from the file cache.

3. The computer-implemented method of claim 1, further comprising:
    determining that the primary application opens a subsequent file;
    setting a subsequent monitoring variable for the subsequent file, wherein the subsequent monitoring variable is set in response to a first read of the subsequent file being at a beginning of the subsequent file;

identifying that the subsequent file is not read according to the pattern; and deleting, in response to identifying that the subsequent file is not read according to the pattern, the first monitoring variable, the second monitoring variable, and the subsequent monitoring variable.

4. The computer-implemented method of claim 3, further comprising:

stopping, in response to identifying that the subsequent file is not read according to the pattern, the release-behind algorithm.

5. The computer-implemented method of claim 1, wherein the primary application is a backup program.

6. The computer-implemented method of claim 1, wherein the primary application is executing a global regular expression print (GREP) command on a directory, wherein the first file is part of the directory.

7. A system comprising:

a processor; and a computer-readable storage medium communicatively coupled to the processor and storing program instructions which, when executed by the processor, are configured to cause the processor to:

determine, by a kernel, that a primary application opens a first file, wherein opening the first file includes writing the first file into a file cache from a storage, and the file cache is configured to receive data from a second application, and a cache management algorithm manages data flow into and out of the file cache;

set, by the kernel, a first monitoring variable for the first file in the primary application process proc structure, wherein the first monitoring variable is set in response to the primary application opening the first file, and wherein the first monitoring variable records a set of all operations completed on the first file, and wherein a first read of the first file is at a beginning of the first file;

determine, by the kernel and based on the set of all operations completed on the first file included in the first monitoring variable, conditioned upon the first file being read according to a pattern by the primary application, read the file entirely, and close the file;

determine, by the kernel, that the primary application opens a second file;

set, by the kernel, a second monitoring variable for the second file, wherein the second monitoring variable is set in response to the primary application opening the second file, and wherein the second monitoring variable records a second set of operations performed on the second file by the first application;

identify, by the kernel, that the second file is read according to the pattern by the first application and initiate, in response to the first file and a second file being read according to the pattern, a release-behind algorithm, wherein the release-behind algorithm alters the cache management algorithm by promptly flushing the first file and the second file from the file cache.

8. The system of claim 7, wherein the program instructions are further configured to cause the processor to:

determine a first cluster of the second file has been read entirely;

initiating reading a second cluster of the second file;

remove, in response to initiating reading the second cluster of the second file, the first cluster of the second file from the file cache;

determine the second cluster of the second file has been read entirely; and remove, in response to determining the second cluster of the second file has been read entirely, the second cluster of the second file from the file cache.

9. The system of claim 7, wherein the program instructions are further configured to cause the processor to:

determine the primary application opens a subsequent file;

set a subsequent monitoring variable for the subsequent file, wherein the subsequent monitoring variable is set in response a first read of the subsequent file being at a beginning of the subsequent file;

identify the subsequent file is not read according to the pattern; and delete, in response to the identifying the subsequent file is not read according to the pattern, the first monitoring variable, the second monitoring variable, and the subsequent monitoring variable.

10. The system of claim 9, wherein the program instructions are further configured to cause the processor to:

stop, in response to identifying the subsequent file is not read according to the pattern, the release-behind algorithm.

11. The computer-implemented method of claim 1, further comprising:

determining that the primary application opens a subsequent file;

setting a subsequent monitoring variable for the subsequent file, wherein the subsequent monitoring variable is set in response to a first read of the subsequent file being at a beginning of the subsequent file;

identifying that the subsequent file is accessed by the second application; and stopping, in response to identifying that the subsequent file is accessed by the second application, the release-behind algorithm.

12. The computer-implemented method of claim 1, further comprising:

deleting, in response to flushing the first file from the cache the first monitoring variable.

13. The computer-implemented method of claim 1, wherein the release-behind algorithm is initiated after two or more consecutive documents are determined to be following the pattern.

14. The method of claim 1, wherein the default algorithm is a least recently used algorithm.

15. The method of claim 1, wherein the default algorithm is a pseudo least recently used algorithm.

16. The method of claim 1, wherein the default algorithm is a first in first out algorithm.

17. The method of claim 3, wherein the deleting of the first monitoring variable includes deleting the set of operations recorded by the first monitoring variable.

* * * * *